(12) United States Patent
Malladi et al.

(10) Patent No.: US 7,821,917 B2
(45) Date of Patent: Oct. 26, 2010

(54) METHOD AND APPARATUS FOR DATA AND PILOT STRUCTURES SUPPORTING EQUALIZATION

(75) Inventors: Durga Prasad Malladi, San Diego, CA (US); Peter Gaal, San Diego, CA (US); Yongbin Wei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/432,245

(22) Filed: Apr. 29, 2009

(65) Prior Publication Data

US 2009/0323666 A1 Dec. 31, 2009

Related U.S. Application Data

(62) Division of application No. 11/388,535, filed on Mar. 24, 2006.

(60) Provisional application No. 60/666,333, filed on Mar. 29, 2005.

(51) Int. Cl.
*H04J 11/00* (2006.01)

(52) U.S. Cl. ........................ 370/210; 370/345

(58) Field of Classification Search ......... 370/203–210, 370/328–339, 470–474, 503
See application file for complete search history.

(56) References Cited

U.S. PATENT DOCUMENTS

| | | | |
|---|---|---|---|
| 6,304,611 B1 | 10/2001 | Miyashita et al. | |
| 6,661,771 B1 * | 12/2003 | Cupo et al. | 370/204 |
| 6,930,996 B2 | 8/2005 | Rudolf et al. | |
| 6,993,068 B1 * | 1/2006 | Isaksson et al. | 375/222 |
| 7,260,054 B2 * | 8/2007 | Olszewski | 370/208 |
| 7,280,552 B2 * | 10/2007 | Isson | 370/441 |
| 7,411,894 B2 * | 8/2008 | Ro et al. | 370/203 |
| 7,471,932 B2 | 12/2008 | Wu et al. | |

(Continued)

FOREIGN PATENT DOCUMENTS

WO WO2005004428 A1 1/2005

OTHER PUBLICATIONS

Naofal Al-Dhahir et al. "A New Maulticarrier Transceiver Based on the Discrete Cosine Transform." IEEE Communications Society: Wireless Communications and Networking Conference, Mar. 13-17, 2005, pp. 45-50.

(Continued)

*Primary Examiner*—Frank Duong
(74) *Attorney, Agent, or Firm*—Larry J. Moskowitz

(57) ABSTRACT

Techniques for transmitting data in a manner to facilitate equalization at a receiver are described. Guard intervals are appended to data blocks such that each data block has a guard interval at the beginning of the data block and a guard interval at the end of the data block. Each guard interval may be discontinuous transmission (DTX), a polyphase sequence, or some other known sequence. Pilot is appended to each set of at least one data block. The data blocks, pilot, and guard intervals may be sent using various slot structures and are processed for transmission. The processing may include mapping the data blocks to at least one physical channel, channelizing the data blocks for each physical channel with a channelization code, combining all physical channels, and scrambling the combined data, pilot, and guard intervals with a scrambling code.

16 Claims, 12 Drawing Sheets

U.S. PATENT DOCUMENTS 7,602,696 B2 * 10/2009 Rhodes ....................... 370/208

OTHER PUBLICATIONS

Yonghong Zeng et al. "Pilot Cyclic Prefixed Single Carrier Communication: Channel Estimation and Equalization." IEEE Signal Processing Letters IEEE USA, vol. 12, No. 1. Jan. 2005, pp. 56-59.

3GPP TS 25.308 v5.2.0, High Speed Downlink Paclet Access (HSDPA), 30 pages, 2002.

Tsumura et al. Design and Performance of Quasi-Synchronous Multi-Carrier CDMA System IEEE 5 pages, 2001.

* cited by examiner

HS-PDSCH

HS-PDSCH

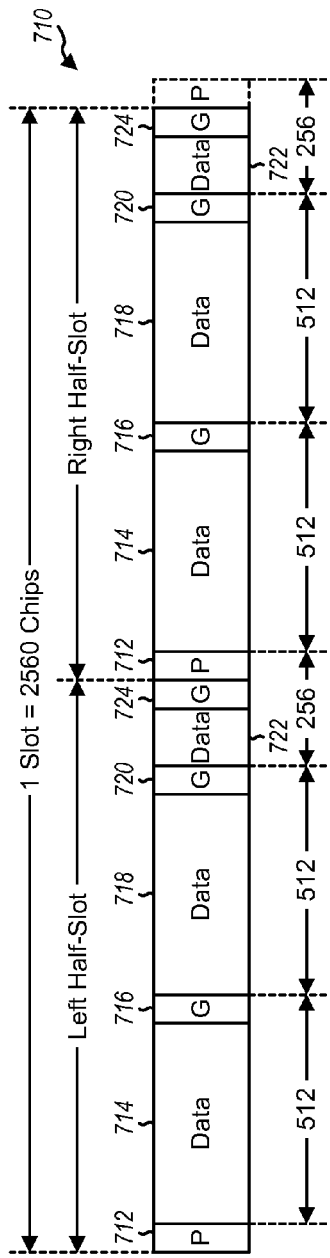
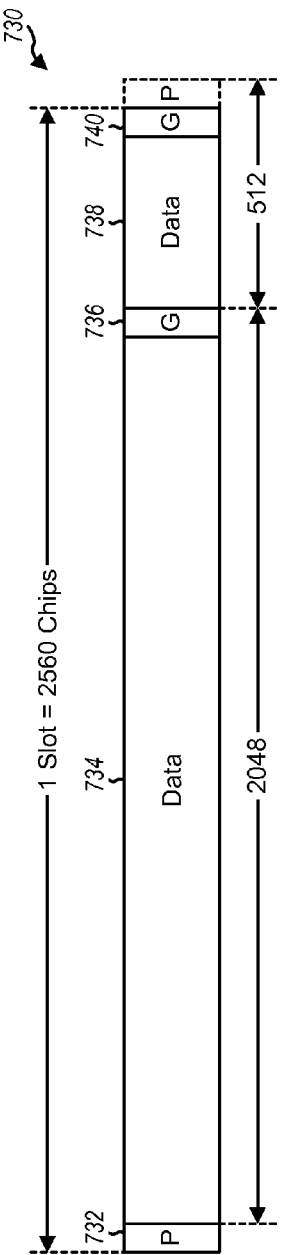
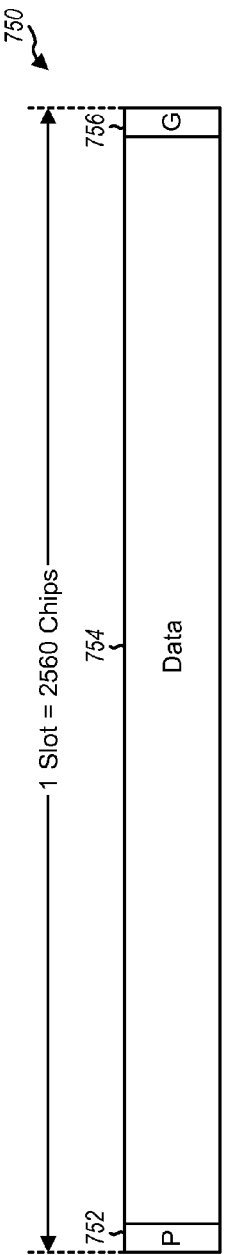
FIG. 7A
FIG. 7B
FIG. 7C

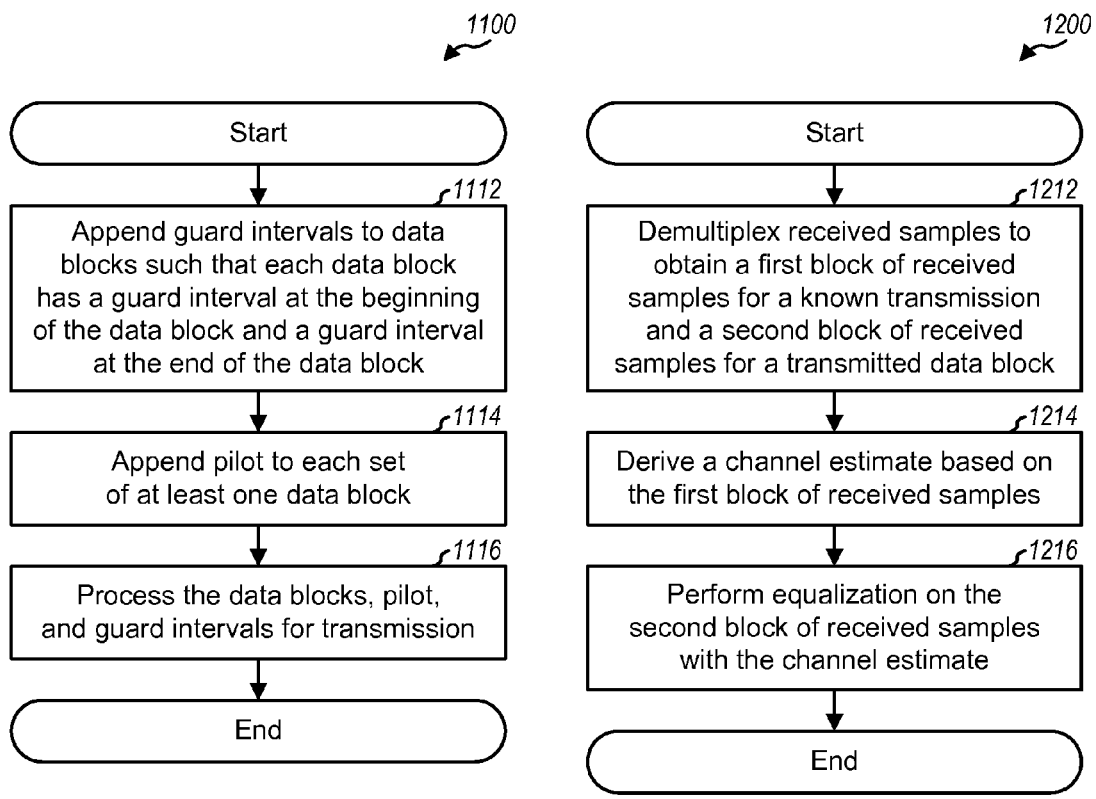

(12) United States Patent
US 7,821,917 B2

METHOD AND APPARATUS FOR DATA AND PILOT STRUCTURES SUPPORTING EQUALIZATION

CLAIM OF PRIORITY UNDER 35 U.S.C. §119

The present application for patent is a divisional of application Ser. No. 11/388,535, filed Mar. 24, 2006 which claims priority to Provisional Application Ser. No. 60/666,333, entitled "METHOD AND APPARATUS FOR IMPROVED EQUALIZATION IN WIRELESS COMMUNICATIONS," filed Mar. 29, 2005, assigned to the assignee hereof, and expressly incorporated herein by reference.

BACKGROUND

I. Field

The present disclosure relates generally to communication, and more specifically to techniques for transmitting and receiving data in a wireless communication system.

II. Background

In a wireless communication system, a transmitter typically processes (e.g., encodes, interleaves, symbol maps, channelizes, and scrambles) traffic data to generate a sequence of chips. The transmitter then processes the chip sequence to generate a radio frequency (RF) signal and transmits the RF signal via a wireless channel. The wireless channel distorts the transmitted RF signal with a channel response and further degrades the signal with noise and interference.

A receiver receives the transmitted RF signal and processes the received RF signal to obtain samples. The receiver may perform equalization on the samples to obtain estimates of the chips sent by the transmitter. The receiver then processes (e.g., descrambles, dechannelizes, demodulates, deinterleaves, and decodes) the chip estimates to obtain decoded data. The equalization performed by the receiver typically has a large impact on the quality of the chip estimates as well as the reliability of the decoded data.

There is therefore a need in the art for techniques to transmit data in a manner to facilitate equalization at a receiver.

SUMMARY

According to an embodiment of the invention, an apparatus is described which includes at least one processor and a memory. The processor(s) append guard intervals to data blocks such that each data block has a guard interval at the beginning of the data block and a guard interval at the end of the data block. Each guard interval may be discontinuous transmission (DTX), a polyphase sequence, or some other known sequence. The processor(s) then process the data blocks and the guard intervals for transmission.

According to another embodiment, a method is provided in which guard intervals are appended to data blocks such that each data block has a guard interval at the beginning of the data block and a guard interval at the end of the data block. The data blocks and the guard intervals are then processed for transmission.

According to yet another embodiment, an apparatus is described which includes means for appending guard intervals to data blocks such that each data block has a guard interval at the beginning of the data block and a guard interval at the end of the data block, and means for processing the data blocks and the guard intervals for transmission.

According to yet another embodiment, an apparatus is described which includes at least one processor and a memory. The processor(s) demultiplex received samples to obtain a first block of received samples for a known transmission and a second block of received samples for a transmitted data block. Data blocks are transmitted such that each data block has a guard interval at the beginning of the data block and a guard interval at the end of the data block. The processor(s) then derive a channel estimate based on the first block of received samples and perform equalization on the second block of received samples with the channel estimate.

According to yet another embodiment, a method is provided in which received samples are demultiplexed to obtain a first block of received samples for a known transmission and a second block of received samples for a transmitted data block, with data blocks being transmitted such that each data block has a guard interval at the beginning of the data block and a guard interval at the end of the data block. A channel estimate is derived based on the first block of received samples. Equalization is then performed on the second block of received samples with the channel estimate.

According to yet another embodiment, an apparatus is described which includes means for demultiplexing received samples to obtain a first block of received samples for a known transmission and a second block of received samples for a transmitted data block, wherein data blocks are transmitted such that each data block has a guard interval at the beginning of the data block and a guard interval at the end of the data block. The apparatus further includes means for deriving a channel estimate based on the first block of received samples and means for performing equalization on the second block of received samples with the channel estimate.

Various aspects and embodiments of the invention are described in further detail below.

BRIEF DESCRIPTION OF THE DRAWINGS

FIGS. 7A, 7B and 7C show additional slot structures for HSDPA.

FIG. 11 shows a process for transmitting data and pilot.

FIG. 12 shows a process for receiving data and pilot.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The techniques described herein may be used for various wireless communication systems such as Code Division Multiple Access (CDMA) systems, Time Division Multiple Access (TDMA) systems, and Frequency Division Multiple Access (FDMA) systems. The terms "system" and "network"

are often used interchangeably. A CDMA network may implement a radio technology such as W-CDMA, cdma2000, and so on. cdma2000 covers IS-2000, IS-856 and IS-95 standards. A TDMA network may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). For clarity, the techniques are specifically described below for a UMTS network that utilizes W-CDMA, and UMTS terminology is used in much of the description below.

Figure 1:
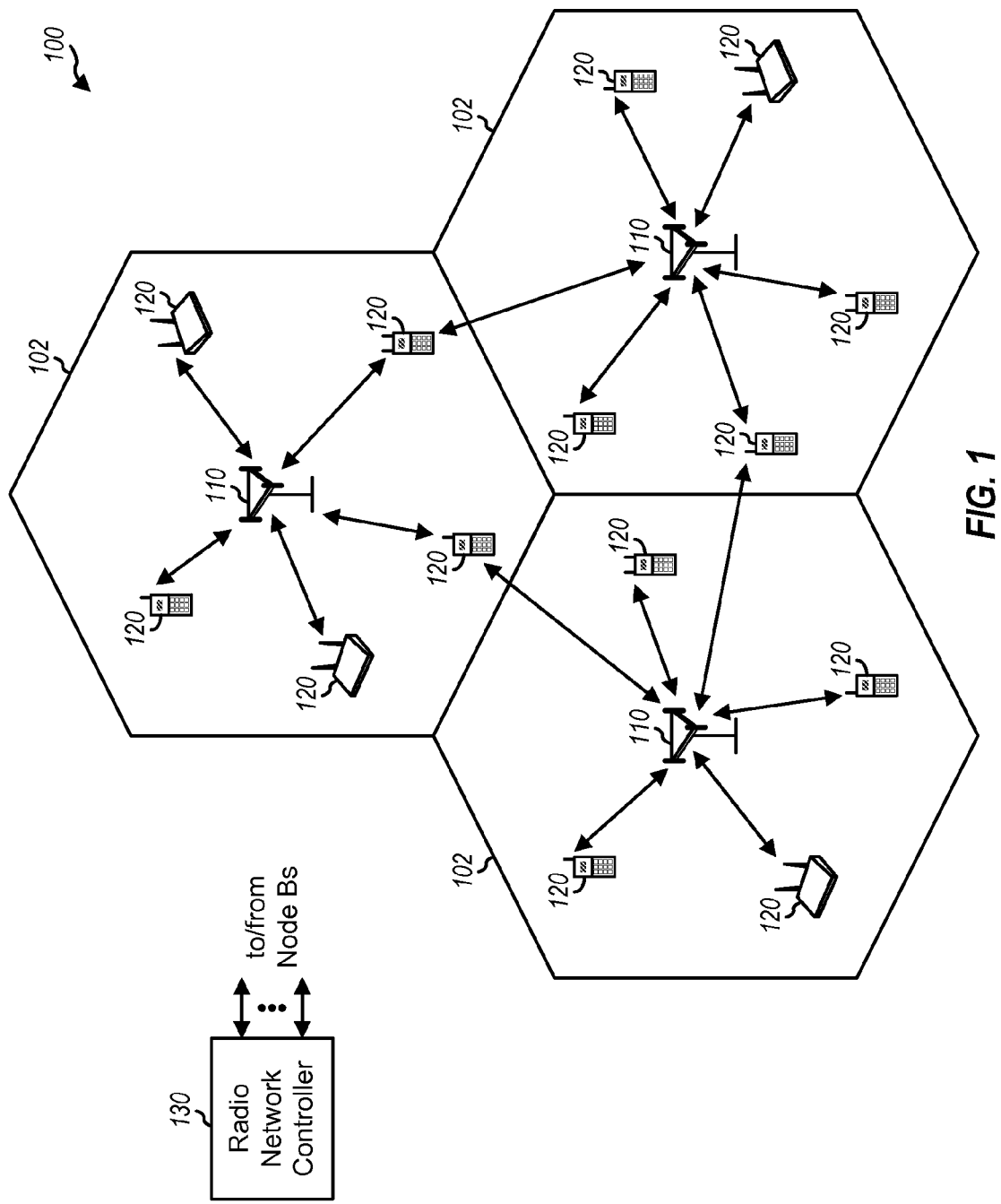
FIG. 1 shows a UMTS network.

FIG. 1 shows a UMTS network 100 with multiple Node Bs 110 and multiple user equipments (UEs) 120. A Node B is generally a fixed station that communicates with the UEs and may also be referred to as a base station, an access point, and/or some other terminology. Each Node B 110 provides communication coverage for a particular geographic area 102. UEs 120 are typically dispersed throughout the network, and each UE may be fixed or mobile. A UE may also be referred to as a mobile station, a user terminal, or some other terminology. A UE may be a cellular phone, a personal digital assistant (PDA), a wireless device, a handheld device, a wireless modem, and so on. The terms "UE" and "user" are used interchangeably below. A UE may communicate with zero, one, or multiple Node Bs on the downlink and/or uplink at any given moment. The downlink (or forward link) refers to the communication link from the Node Bs to the UEs, and the uplink (or reverse link) refers to the communication link from the UEs to the Node Bs. A Radio Network Controller (RNC) 130 couples to Node Bs 110 and provides coordination and control for the Node Bs.

In W-CDMA, data to be transmitted to a UE is processed as one or more transport channels at a higher signaling layer. The transport channels may carry data for one or more services, e.g., voice, video, packet data, and so on. The transport channels are mapped to physical channels at a physical layer. The physical channels are channelized with different orthogonal variable spreading factor (OVSF) codes and are orthogonal to one another in code domain. The OVSF codes are also referred to as channelization codes.

W-CDMA Release 5 and later supports High-Speed Downlink Packet Access (HSDPA), which is a set of channels and procedures that enables high-speed packet data transmission on the downlink. For HSDPA, data is processed in blocks that are multiplexed onto a High Speed Downlink Shared Channel (HS-DSCH), which is a transport channel. The HS-DSCH may be mapped to one to more (up to 15) High Speed Physical Downlink Shared Channels (HS-PDSCHs), which are physical channels. The HS-PDSCHs may carry data in a time and code division multiplexed (TDM/CDM) manner for multiple UEs. Control information for the HS-PDSCHs is sent on one or more Shared Control Channels for HS-DSCH (HS-SCCHs), which are physical channels. The control information conveys various parameters used by the UEs to properly receive and process the HS-PDSCHs.

UMTS network 100 may support one or more W-CDMA releases such as Release 99 (Rel-99), Release 5 (Rel-5), Release 6 (Rel-6), and/or later releases. In the following description, Release x (Rel-x) is a release that is later than Release 6. Each release provides enhancements to prior releases.

Release 5 introduces the following features:
HSDPA for peak data rate of 14.4 megabits/second (Mbps) on the downlink,
Space Time Transmit Diversity (STTD) and Closed Loop Transmit Diversity (CLTD) for downlink transmission from two antennas, and
Transmission of dedicated pilot to specific UEs. Release 6 introduces the following features:
Enhanced uplink with peak data rate of 4.1 Mbps,
Mapping of DCCH to HS-DSCH to send signaling messages, e.g., for handoff,
Fractional Dedicated Physical Channel (F-DPCH) for sending transmit power command (TPC) and dedicated pilot to multiple UEs in a TDM manner, and
Multimedia Broadcast Multicast Service (MBMS) for enhanced broadcast capability.

Releases 5 and 6 are backward compatible with Release 99. Later releases may or may not be backward compatible with earlier releases.

UMTS network 100 may operate on a single carrier or multiple carriers. Each carrier has a bandwidth of approximately 5 MHz and is centered at a specific frequency. Multiple carriers may be used to improve capacity.

Figure 2:
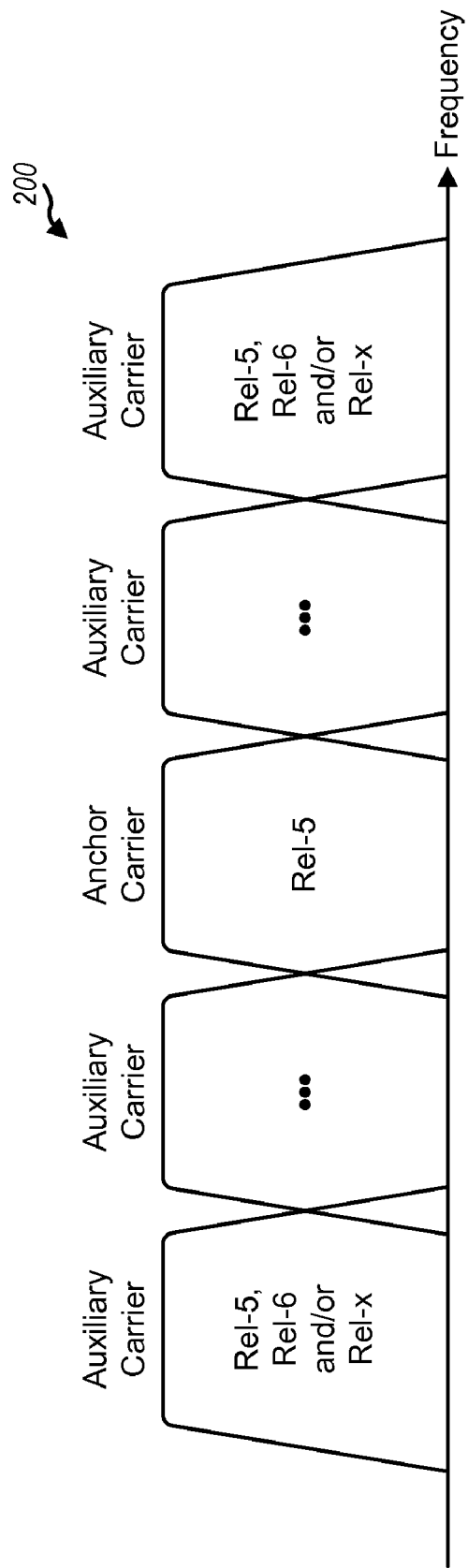
FIG. 2 shows an exemplary deployment of multiple carriers.

FIG. 2 shows an exemplary deployment 200 of multiple carriers. In general, any number of carriers may be deployed for multi-carrier W-CDMA (MC-WCDMA). In the embodiment shown in FIG. 2, one carrier is designated as an anchor carrier that supports Release 5. The remaining carriers are designated as auxiliary carriers. Each auxiliary carrier may support Release 5, Release 6, and/or Release x. The anchor carrier may carry common channels that support system acquisition, access, paging, broadcast, and so on. These common channels may include the following:

Synchronization Channel (SCH)—carry timing and information for acquisition,
Primary Common Control Physical Channel (P-CCPCH)—carry system and access parameters,
Secondary CCPCH (S-CCPCH)—carry page messages and other UE directed signaling messages while the UE is in idle mode,
Acquisition Indicator Channel (AICH)—carry responses for access probes,
Page Indicator Channel (PICH)—carry paging indicators for page messages, and
MBMS Indicator Channel (MICH)—carry indicators for MBMS messages.

For the multi-carrier structure shown in FIG. 2, a UE may initially tune to the anchor carrier when first powered on. The UE may acquire system timing based on the SCH, decode the P-CCPCH to obtain system and access parameters, send access probes on a Physical Random Access Channel (PRACH), and wait for a response on the AICH. The UE may then perform registration and setup with the UMTS network and may thereafter enter a CELL_DCH state. In the CELL_DCH state, the UE is assigned a Dedicated Channel (DCH) and may send and/or receive data. The UE may remain on the anchor carrier to communicate with the network. The UE may also be handed off to an auxiliary carrier. The UE may receive and/or transmit data via multiple carriers to improve throughput.

Each auxiliary carrier may or may not carry the common channels listed above. To reduce overhead, the network may send the common channels on only the anchor carrier. In this case, a UE may tune to the anchor carrier for system access as well as while in an Idle mode. The UE may be handed off to one or more auxiliary carriers in the CELL_DCH state. The UE may make inter-frequency measurements and report the measurements to the network. The network may direct the UE to a suitable carrier based on the measurements.

Figure 3:
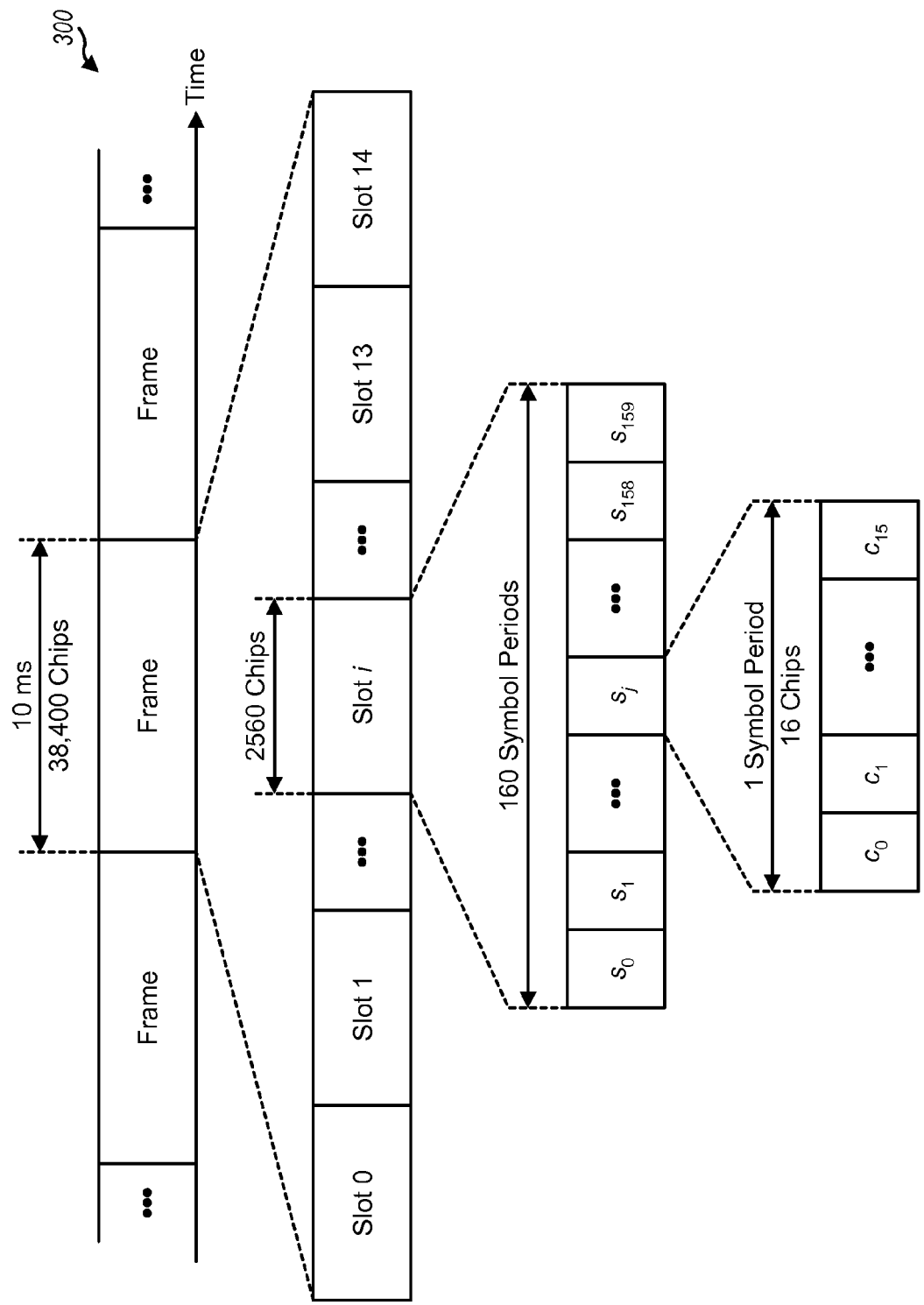
FIG. 3 shows a frame structure in W-CDMA.

FIG. 3 shows a frame structure 300 in W-CDMA. The timeline for transmission on the downlink is divided into radio frames. Each radio frame is identified by a 12-bit system frame number (SFN) that is transmitted on a control channel. Each radio frame has a duration of 10 milliseconds (ms) and is further partitioned into 15 slots, which are labeled as slot 0 through slot 14. Each slot includes 2560 chips and has a duration of 0.667 ms. Each chip has a duration of 260.42 nanoseconds (ns) for a chip rate of 3.84 megachips/second (Mcps).

Up to 15 HS-PDSCHs may be sent on each carrier for HSDPA. The HS-PDSCHs are sent in transmission time intervals (TTIs), which are also called sub-frames. Each TTI spans three slots and has a duration of 2 ms. A new TTI for the HS-PDSCHs starts at the frame boundary. The HS-PDSCHs are assigned channelization codes with spreading factor of 16. For the HS-PDSCHs, each slot spans 160 symbol periods, and each symbol period includes 16 chips. A data symbol may be sent in each symbol period and is channelized or spread with a 16-chip channelization code to generate 16 data chips that are sent in 16 chip periods. As used herein, a data symbol is a symbol for data, a pilot symbol is a symbol for pilot, a signaling symbol is a symbol for signaling, and a symbol is generally a complex value. A symbol may be a modulation symbol for a modulation scheme, e.g., M-PSK or M-QAM. A pilot is a transmission that is known a priori by both a transmitter and a receiver.

Figure 4:
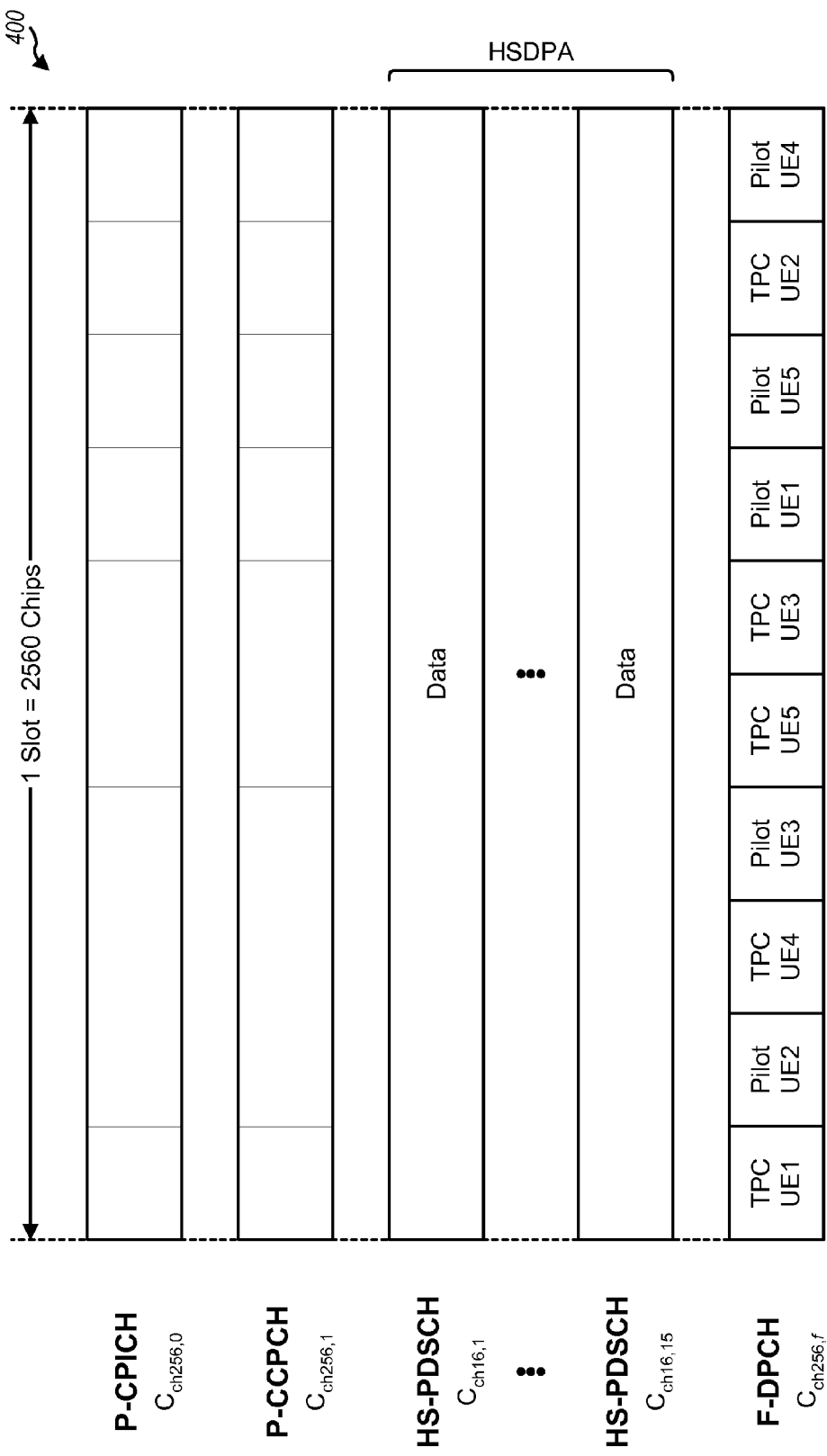
FIG. 4 shows a slot structure in W-CDMA Releases 5 and 6.

FIG. 4 shows a slot structure 400 for some downlink physical channels in Releases 5 and 6. A slot structure may also be referred to as a slot format, a data and pilot structure, and so on. A Primary Common Pilot Channel (P-CPICH) carries 10 pilot symbols per slot and is spread with channelization code $C_{ch256,0}$. In general, channelization code $C_{chK,k}$ is the k-th code of length K in the OVSF code tree, where K may be any power of two, e.g., 16, 128, or 256. The P-CCPCH carries 10 signaling symbols per slot and is spread with channelization code $C_{ch256,1}$. In Releases 5 and 6, up to 15 HS-PDSCHs may be sent for HSDPA using channelization codes $C_{ch16,1}$ through $C_{ch16,15}$. The HS-PDSCHs used in Releases 5 and 6 are referred to herein as Rel-5 HS-PDSCHs. Each Rel-5 HS-PDSCH carries up to 160 data symbols per slot and is spread with a different 16-chip channelization code. In Release 6, an F-DPCH may be sent using a 256-chip channelization code $C_{ch256,f}$ which may be selected by a Node B and signaled to the UEs. The F-DPCH may carry up to 10 symbols for TPC and/or dedicated pilot for specific UEs.

It is desirable to perform equalization at a UE to achieve good performance. Equalization is particularly important at high data rates, such as the data rates envisaged in multi-carrier HSDPA (MC-HSDPA). In general, equalization may be performed in the time domain or the frequency domain. A time-domain equalizer with a large number of taps may be used to achieve good performance. Time-domain equalization may be complex since the taps are derived jointly and a large matrix inversion may be required. A frequency-domain equalizer with a large number of coefficients may also be used to achieve good performance. However, frequency-domain equalization may be simpler since the coefficients may be derived separately for each frequency tone or bin. Hence, it is desirable to have slot structures that support frequency-domain equalization.

To facilitate frequency-domain equalization at a receiver, a transmitter may insert guard intervals between data blocks prior to transmission. The guard interval at the beginning of a data block is referred to as a prefix, and the guard interval at the end of the data block is referred to as a suffix. The prefix should be equal to the suffix for each data block. This cyclic property converts a linear convolution with a wireless channel to a circular convolution, if the prefix and suffix are sufficiently long. The cyclic property combats inter-symbol interferences (ISI) and allows the receiver to perform a fast Fourier transform (FFT) on each received data block to obtain frequency-domain symbols. The receiver may then perform equalization on these symbols in the frequency domain, as described below.

Figure 5:
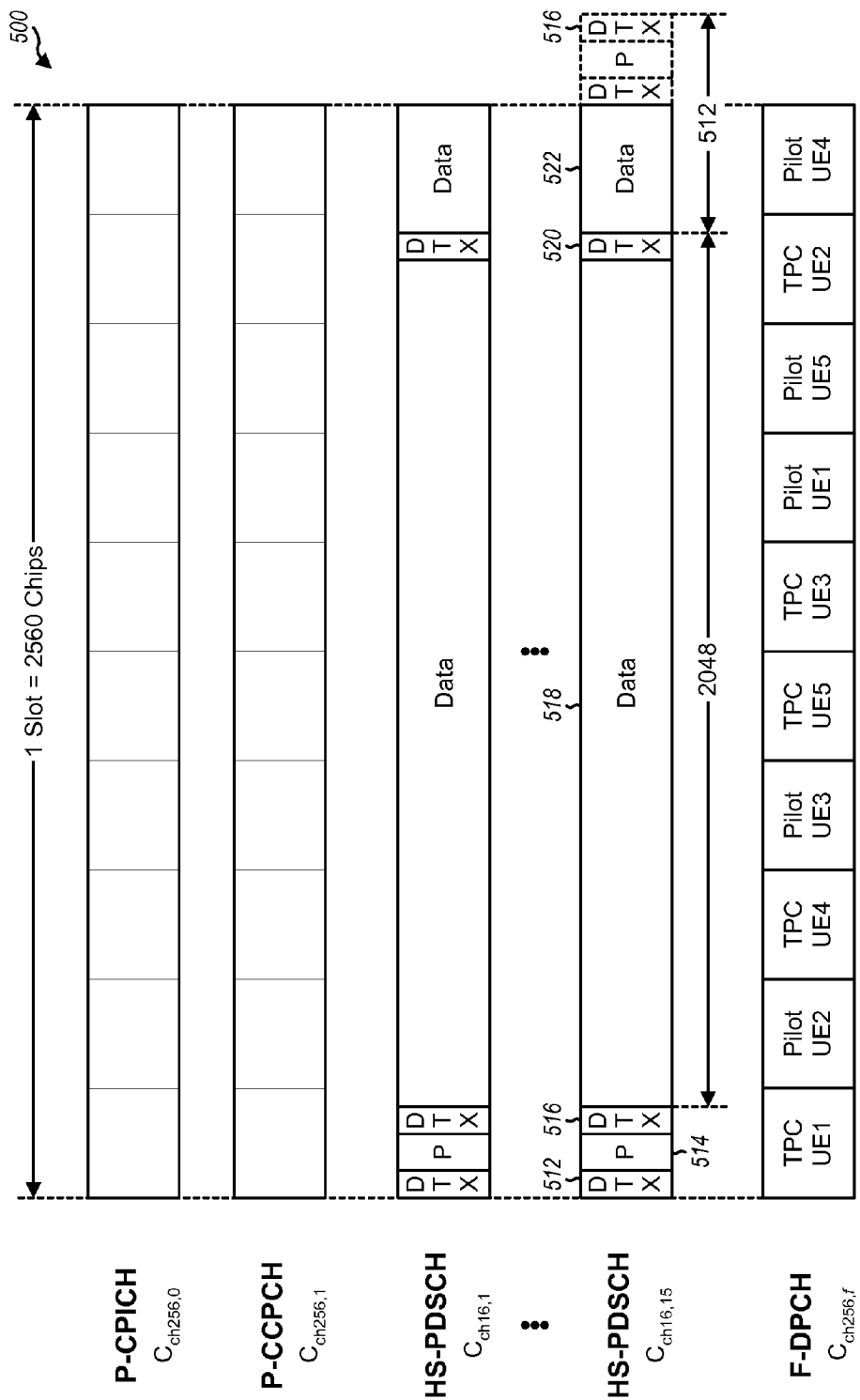
FIG. 5 shows a slot structure that supports equalization for the HS-PDSCHs.

FIG. 5 shows an embodiment of a slot structure 500 that supports equalization for the HS-PDSCHs and is backward compatible with Releases 5 and 6. In this embodiment, the P-CPICH may be sent with channelization code $C_{ch256,0}$ and the P-CCPCH may be sent with channelization code $C_{ch256,1}$, as described above for FIG. 4.

Up to 15 new HS-PDSCHs may be sent for HSDPA using channelization codes $C_{ch16,1}$ through $C_{ch16,15}$. These new HS-PDSCHs are referred to herein as Rel-x HS-PDSCHs. In the embodiment shown in FIG. 5, a slot for a Rel-x HS-PDSCH includes a guard field 512, a TDM pilot (P) field 514, a guard field 516, a first data field 518, a guard field 520, and a second data field 522. Each guard field provides a guard interval between two transmissions, e.g., between two data blocks or between a data block and pilot. In the embodiment shown in FIG. 5, each guard field is DTX, which comprises zero signal values that are essentially not transmitted. Pilot field 514 carries pilot symbols that may be used for channel estimation. Each of data fields 518 and 522 may carry a data block that may include any number of data symbols.

In general, each field of the Rel-x HS-PDSCHs may have any suitably selected duration. Each guard field may be used as a prefix for one data block and/or as a suffix for another data block. The duration of each guard field may be selected to be equal to or longer than an effective delay spread, which is the sum of the channel delay spread and the time extent of a Root-Raised-Cosine (RRC) autocorrelation. The channel delay spread is the expected difference between the earliest and latest arriving signal paths at a receiver. The RRC autocorrelation is the correlation between an RRC pulse shaping filter at a transmitter and a matched filter at a receiver. A sufficiently long guard field reduces ISI.

Multiple Rel-5 and/or Rel-x HS-PDSCHs may be sent simultaneously using different channelization codes. In this case, each field of the Rel-x HS-PDSCHs may be selected to be an integer multiple of the channelization code length for the HS-PDSCHs, or 16·L, where $L \geq 1$. This constraint maintains orthogonality among the HS-PDSCHs being sent simultaneously. In a specific embodiment, each guard field spans 48 chips, the pilot field spans 80 chips, the first data field spans 2000 chips, and the second data field spans 336 chips. This embodiment allows the receiver to perform a 2048-point FFT for the data block sent in data field 518 and a 512-point FFT for the data block sent in data field 522. In this embodiment, the overhead for the TDM pilot and the guard intervals is 8.75%. The fields of the Rel-x HS-PDSCHs may also have other durations.

In an embodiment, the data fields of each Rel-x HS-PDSCH are channelized with the channelization code for that HS-PDSCH. In an embodiment, the TDM pilot of each Rel-x HS-PDSCH is sent with channelization code $C_{ch256,0}$. In this embodiment, the same TDM pilot is sent on all Rel-x HS-PDSCHs as well as the P-CPICH, which reduces interference on the TDM pilot and allows a receiver to derive a more accurate channel estimate. The TDM pilot may be any sequence having good temporal and spectral characteristics, e.g., a polyphase sequence described below.

The Rel-x HS-PDSCH slot structure shown in FIG. 5 has various desirable features. First, a prefix and a suffix are provided for each data block, which allows a receiver to perform accurate frequency domain processing for each data block. In particular, guard field 516 is the prefix and guard field 520 is the suffix for the data block sent in data field 518. Guard field 520 is also the prefix for the data block sent in data field 522, and guard field 516 in the next slot is the suffix for this data block. Thus, guard fields 516 and 520 are each efficiently used as a prefix for one data block and as a suffix for another data block. Guard field 512 isolates the TDM pilot sent in pilot field 514 from the data block sent in data field 522 of a preceding slot.

Guard filed 512 creates a cyclic structure for the pilot sent in field 514. This cyclic structure enables frequency domain processing of the pilot for channel estimation purposes independent of the processing mode for the data sent in field 522. In one use of the pilot, channel estimation is achieved before equalization by processing pilot field 514. To enable this use, guard field 512 should have a length comparable to that of guard fields 516 and 520. In another use of the pilot, a residual channel estimate may be obtained by processing pilot field 514 after equalization. The residual channel includes the compound effects of the wireless channel and the equalizer. Since the residual channel typically has a shorter delay spread than the wireless channel itself, to enable this use, guard field 512 may be of shorter length than guard fields 516 and 520. In the exemplary embodiment shown in FIG. 5, guard field 512 is of the same length as guard fields 516 and 520 and hence supports both uses of pilot field 514.

The use of DTX for the guard fields preserves the cyclic property for each data block in the presence of scrambling. In W-CDMA, a Node B channelizes the data for each physical channel with the assigned channelization code, sums the channelized data for all physical channels, and scrambles the summed data with a scrambling code to generate output chips. If the prefix and suffix for a given data block are equal but non-zero, then the scrambling would result in the prefix being different from the suffix because the portion of the scrambling code applied to the prefix is likely not equal to the portion of the scrambling code applied to the suffix. A receiver performs equalization first, followed by descrambling. Thus, if the prefix and suffix are non-zero, then the scrambling would destroy the cyclic property for the data block since the prefix is no longer equal to the suffix when the equalization is performed, which would then degrade performance. The use of DTX for the prefix and suffix preserves the cyclic property at the time of equalization, which is desirable.

Since all of the physical channels are combined and then scrambled, it is desirable to have no transmissions from other physical channels during the guard intervals in the Rel-x HS-PDSCHs. For the F-DPCH, DTX may be sent in the first and ninth symbol periods that overlap the guard intervals of the Rel-x HS-PDSCHs, as shown in FIG. 5. TPC and dedicated pilot for up to four UEs may be sent in a TDM manner on the F-DPCH in the remaining eight symbol periods, as shown in FIG. 5. The F-DPCH is orthogonal to the Rel-x HS-PDSCHs during most of the data portions because of the code division multiplexing.

A Node B may support both Rel-5/6 users as well as Rel-x users. Rel-5/6 users are users that support Release 5 and/or 6. Rel-x users are users that are capable of receiving the Rel-x HS-PDSCHs shown in FIG. 5. The Node B may transmit TPC and dedicated pilot on the F-DPCH to the Rel-5/6 users, e.g., as shown in FIG. 5. In this case, the Rel-x users do not impact the Rel-5/6 users, and vice versa. Alternatively or additionally, the Node B may transmit a continuous P-CPICH to support the Rel-5/6 users and may also transmit Rel-5 HS-PDSCHs using the slot structure shown in FIG. 4. The Node B may also transmit the P-CCPCH and/or other physical channels. In this case, each physical channel that overlaps the guard intervals of the Rel-x HS-PDSCHs would disturb the cyclic property and hence impact the Rel-x users. For each of these physical channels, the Node B may either puncture (i.e., replace with DTX) or attenuate the sections of the physical channel that overlap the guard intervals of the Rel-x HS-PDSCHs in order to retain the cyclic property. The degradation to the Rel-5/6 users due to the puncturing may be small since the guard intervals (e.g., 3×48 chips) represent a small fraction (e.g., 5.6%) of a slot. The Rel-x HS-PDSCHs do not impact the Rel-5/6 users otherwise.

Figure 6A:
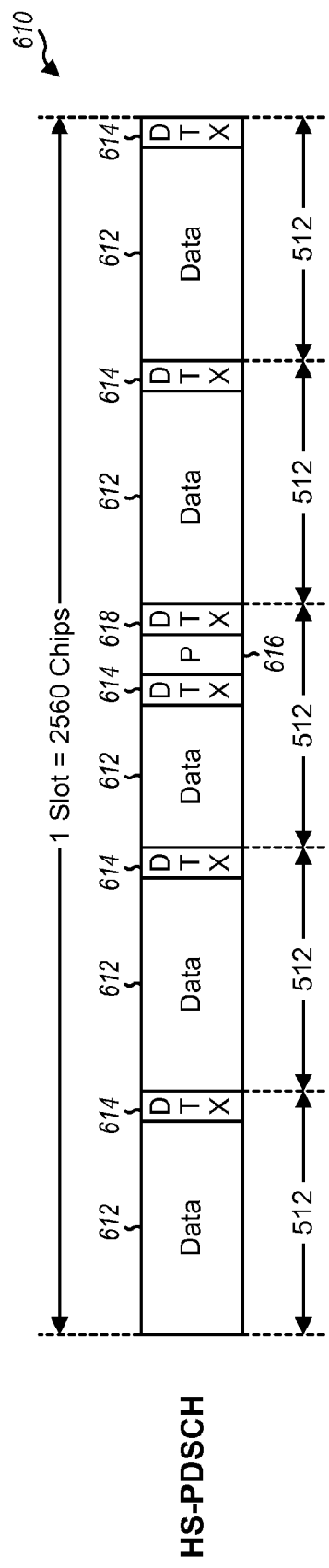
FIGS. 6A and 6B show additional slot structures that support equalization.

FIG. 6A shows another embodiment of a slot structure 610 that supports equalization for the HS-PDSCHs. In this embodiment, a slot for a Rel-x HS-PDSCH is partitioned into five segments of 512 chips. Each segment includes a data field 612 and a guard field 614. The middle segment further includes a TDM pilot (P) field 616 and a guard field 618. In the embodiment shown in FIG. 6A, each guard field is DTX. Each data field 612 is then flanked on the left side by a DTX prefix and is also flanked on the right side by a DTX suffix. In an embodiment, data field 612 in each segment except for the center segment has a duration of 464 chips, data field 612 in the center segment has a duration of 336 chips, each guard field has a duration of 48 chips, and TDM pilot field 616 has a duration of 80 chips. The fields may also have other durations. This embodiment allows a receiver to perform a 512-point FFT for each segment. The receiver may also perform frequency-domain equalization for the five segments using a single frequency-domain equalizer, which may reduce computation. The TDM pilot is placed near the middle of the slot and may provide channel estimates of similar quality for the first and last segments in the slot.

Figure 6B:
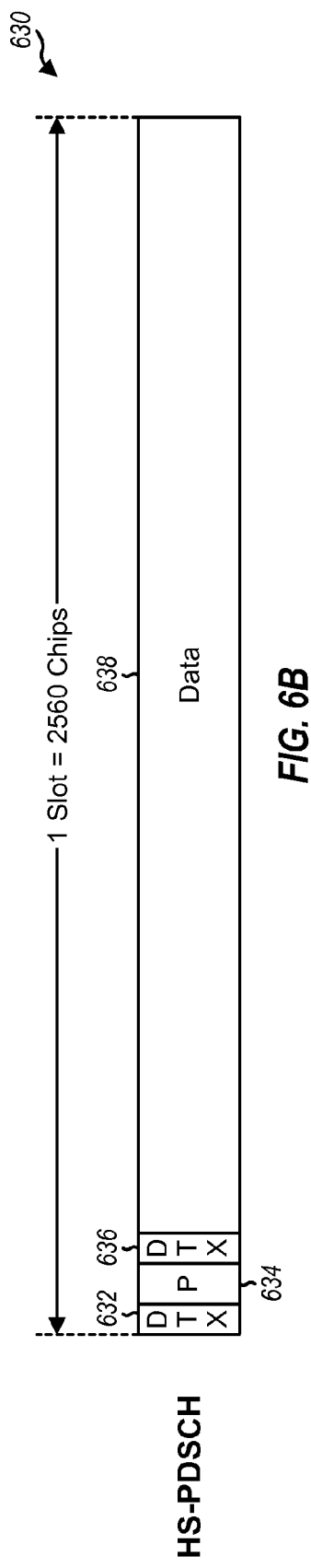

FIG. 6B shows yet another embodiment of a slot structure 630 that supports equalization for the HS-PDSCHs. In this embodiment, a slot for a Rel-x HS-PDSCH includes a guard field 632, a TDM pilot (P) field 634, a guard field 636, and a data field 638. This embodiment minimizes the number of guard fields in a slot.

FIGS. 5, 6A and 6B show several embodiments of slot structures that support frequency-domain equalization for Rel-x HS-PDSCHs and also support other physical channels. The use of DTX for the guard intervals of the Rel-x HS-PDSCHs retains the cyclic property in the presence of scrambling. Some degradation to the cyclic property may result from other physical channels being sent during the guard intervals, which impacts the performance of Rel-x users. This degradation may be avoided by puncturing the other physical channels during the guard intervals, which impacts the performance of Rel-5/6 users. The network may decide (1) whether to simultaneously support both Rel-5/6 users and Rel-x users on the same carrier and, if yes, (2) the trade-off between the performance of Rel-5/6 users and Rel-x users. These decisions may be made on a per-carrier basis.

Various other slot structures may also be defined. If scrambling is not performed, then a non-zero prefix sequence with good temporal and spectral characteristics may be used for the guard intervals. This prefix sequence allows for full utilization of the available transmit power at a Node B during the guard periods. The prefix sequence may also allow a UE to achieve better performance.

FIG. 7A shows an embodiment of a slot structure 710 for HSDPA. In this embodiment, a slot is partitioned into two half-slots of 1280 chips. Each half-slot includes a pilot (P) field 712, a data field 714, a guard (G) field 716, a data field 718, a guard field 720, a data field 722, and a guard field 724.

The pilot may also be referred to as a prefix, and each guard interval may also be referred to as a suffix.

In general, each field may have any suitable duration. In an embodiment, each of data fields 714 and 718 has a duration of 448 chips, data field 722 has a duration of 128 chips, pilot field 712 has a duration of 64 chips, and each guard field has a duration of 64 chips. This embodiment allows a receiver to perform a 512-point FFT for each of data fields 714 and 718 and a 256-point FFT for data field 722, as shown in FIG. 7A.

The embodiment in FIG. 7A has a 64-chip guard interval, which is longer than the 48-chip guard interval used for the embodiments in FIGS. 5 through 6B. The longer guard interval is more robust against a long channel delay spread at the expense of more overhead. The fields may also have other durations.

FIG. 7B shows another embodiment of a slot structure 730 for HSDPA. In this embodiment, a slot includes a pilot (P) field 732, a data field 734, a guard (G) field 736, a data field 738, and a guard field 740. In an embodiment, data field 734 has a duration of 1984 chips, data field 738 has a duration of 384 chips, pilot field 732 has a duration of 64 chips, and each guard field has a duration of 64 chips. This embodiment allows a receiver to perform a 2048-point FFT for data field 734 and a 512-point FFT for data field 738, as shown in FIG. 7B. The fields may also have other durations.

FIG. 7C shows yet another embodiment of a slot structure 750 for HSDPA. In this embodiment, a slot includes a pilot (P) field 752, a data field 754, and a guard (G) field 756. In an embodiment, data field 754 has a duration of 2432 chips, pilot field 752 has a duration of 64 chips, and guard field 756 has a duration of 64 chips. The fields may also have other durations. This embodiment minimizes the number of guard fields in a slot.

Various other slot structures may also be defined. In general, each slot may include any number of data fields, any number of pilot fields, and any number of guard fields. A slot may also include additional and/or different fields. Each field may have any suitable duration. The duration of the guard fields may be selected based on the effective delay spread. The duration of the pilot field may be selected based on the effective delay spread and on the desired channel estimation performance. The durations of the data fields may be selected based on a tradeoff between complexity at a receiver (e.g., for transforms between the time and frequency domains, equalization, and so on) and the amount of overhead for the guard intervals.

In the embodiments shown in FIGS. 7A through 7C, each data field is flanked on the right side by a guard field (or suffix) and is flanked on the left side by either a pilot field or a guard field. The pilot and suffix may be used for different purposes. In particular, the pilot may be used for obtaining channel estimation before the frequency-domain equalization, and the suffix may be used for residual ISI correction after the frequency-domain equalization.

In an embodiment, the pilot and guard fields carry the same prefix sequence. Various sequences may be used for the prefix sequence. In an embodiment, a polyphase sequence with good temporal and spectral characteristics is used for the prefix sequence. Good temporal and spectral characteristics may be quantified by a constant amplitude frequency response across the entire system bandwidth, a constant time-domain envelope, an autocorrelation that is zero at all time offsets except for zero offset, and/or other properties. Various polyphase sequences are available including a Chu sequence, a Golomb sequence, P1, P3, P4 and Px sequences, and a Frank sequence. The Chu sequence may be expressed as:

$$p(n)=e^{-j\cdot\pi\cdot n^2/P} \text{ for } n=0,\ldots,P-1, \quad \text{Eq (1)}$$

where p(n) represents the chips of the polyphase sequence, which is the Chu sequence in equation (1), and P is the length of the polyphase sequence. In general, P may be any integer value greater than one. In an embodiment, P=64, and a 64-chip Chu sequence may be sent in each of the pilot and guard fields in FIGS. 7A through 7C.

Data may be sent in various manners using the slot structures shown in FIGS. 7A through 7C. In one embodiment, a single Rel-x HS-PDSCH is sent without channelization or scrambling. In this embodiment, a data symbol may be sent in each chip period of each data field. In another embodiment, multiple Rel-x HS-PDSCHs may be sent simultaneously, and the data blocks for each Rel-x HS-PDSCH are channelized with a different channelization code, as described above for FIG. 5. Scrambling may be performed on the data blocks but not on the pilot and guard intervals so that the cyclic property for the data blocks is not disturbed.

For the slot structure shown in FIG. 7A, 7B or 7C, the received samples for the pilot may be expressed as:

$$y_p(n)=c(n)\otimes p(n)+w_p(n), \quad \text{Eq (2)}$$

where
c(n) is an effective channel response observed by the pilot,
p(n) represents the transmitted samples for the pilot,
$y_p(n)$ represents the received samples for the pilot,
$w_p(n)$ represents the noise for the pilot, and
⊗ denotes a circular convolution.

The effective channel response may be given as:

$$c(n)=h(n)\otimes c'(n)\otimes h^*(-n) \quad \text{Eq (3)}$$

where
h(n) is the response of a pulse shaping filter at a transmitter,
c'(n) is the response of the wireless channel, and
h*(−n) is the response of a matched filter at a receiver.

The receiver may perform an FFT on the received samples for the pilot to obtain frequency-domain symbols, which may be expressed as:

$$Y_p(k)=\sqrt{P}\cdot C(k)\cdot P(k)+W_p(k), \quad \text{Eq (4)}$$

where $Y_p(k)$, $C(k)$, $P(k)$ and $W_p(k)$ are frequency-domain representations of $y_p(n)$, $c(n)$, $p(n)$ and $w_p(n)$, respectively, and P is the duration of the pilot field.

The receiver may derive a channel frequency response estimate based on a minimum mean square error (MMSE) criterion, as follows:

$$\hat{C}(k) = \frac{\sqrt{P}\cdot R_{cc}(k)\cdot P^*(k)}{P\cdot R_{cc}(k)\cdot |P(k)|^2 + R_{wp}(k)} \cdot Y_p(k,) \quad \text{Eq (5)}$$

where
$R_{cc}(k)=\mathcal{E}\{|C(k)|^2\}$ is the expected channel energy for tone k,
$R_{wp}(k)=\mathcal{E}\{|W_p(k)|^2\}$ is the expected noise energy for tone k,
$\mathcal{E}\{\ \}$ denotes an expectation operation, and
$\hat{C}(k)$ is a channel gain estimate for tone k.

$R_{cc}(k)$ and $R_{wp}(k)$ represent a priori channel and noise statistics that may be derived based on prior received samples.

The receiver may also derive a channel frequency response estimate based on a zero-forcing MMSE (ZF-MMSE) criterion, as follows:

$$\hat{C}(k) = \frac{1}{\sqrt{P}} \cdot \frac{Y_p(k)}{P(k)}. \qquad \text{Eq (6)}$$

Equation (6) is equal to equation (5) with $R_{cc}(k)>0$ and $R_{wp}(k)=0$.

The receiver may derive a channel gain estimate for each of P tones, or $k=0, \ldots, P-1$. The receiver may then perform a P-point inverse FFT (IFFT) on the P channel gain estimates to obtain a time-domain channel impulse response estimate with P channel taps. The receiver may zero out channel taps with low energy below a predetermined threshold, insert zeros to obtain N total channel taps and zeros, and perform an N-point FFT to obtain a channel frequency response estimate with N channel gain estimates for N tones. N is the number of tones for a data block and may be equal to 512 for data fields 714 and 718 or 256 for data field 722 in FIG. 7A. The receiver may filter the received samples, the channel gain estimates, and/or the channel taps across multiple pilot transmissions to reduce noise and estimation errors.

The received samples for a data block may be expressed as:

$$y_b(n) = c(n) \otimes b(n) + w_b(n), \qquad \text{Eq (7)}$$

where b(n) represents the transmitted samples for the data block and its suffix, $y_b(n)$ represents the received samples for the data block and its suffix, and $w_b(n)$ represents the noise.

The transmitted samples for the data block sent in field 714 and the guard interval/suffix sent in field 716 in FIG. 7A may be expressed as:

$$b(n) = \begin{cases} d(n-64) & \text{for } 64 \le n \le 511, \\ g(n-512) & \text{for } 512 \le n \le 575, \end{cases} \qquad \text{Eq (8)}$$

where d(n) represents the samples in the data block sent in data field 714, and g(n) represents the samples in the prefix sequence sent in guard field 716.

The prefix sequence g(n) for the suffix may be equal to the prefix sequence p(n) for the pilot, or g(n)=p(n).

The receiver may perform an FFT on the received samples for the data block to obtain frequency-domain symbols, which may be expressed as:

$$Y_b(k) = \sqrt{D} \cdot C(k) \cdot B(k) + W_b(k), \qquad \text{Eq (9)}$$

where $Y_b(k)$, $C(k)$, $B(k)$ and $W_b(k)$ are frequency-domain representations of $y_b(n)$, $c(n)$, $b(n)$ and $w_b(n)$, respectively, and D is the size of the data block and guard interval.

The receiver may perform frequency-domain equalization for the data block based on the MMSE criterion, as follows:

$$\hat{B}(k) = \frac{\sqrt{D} \cdot R_{bb}(k) \cdot \hat{C}^*(k)}{D \cdot R_{bb}(k) \cdot |\hat{C}(k)|^2 + R_{wb}(k)} \cdot Y_b(k), \qquad \text{Eq (10)}$$

where $R_{bb}(k) = \mathcal{E}\{|B(k)|^2\}$ is the expected signal energy for tone k, $R_{wb}(k) = \mathcal{E}\{|W_p(k)|^2\}$ is the expected noise energy for tone k, and $\hat{B}(k)$ is an equalized symbol for tone k, which is an estimate of B(k).

$R_{bb}(k)$ and $R_{wb}(k)$ represent signal and noise statistics that may be derived based on prior received samples.

The receiver may also perform frequency-domain equalization for the data block based on the ZF-MMSE criterion, as follows:

$$\hat{B}(k) = \frac{1}{\sqrt{D}} \cdot \frac{Y_b(k)}{\hat{C}(k)}. \qquad \text{Eq (11)}$$

The receiver may perform an IFFT on the equalized symbols to obtain equalized samples $\hat{b}(n)$ for the data block. The equalized samples $\hat{d}(n)$ for data field 714 and the equalized samples $\hat{g}(n)$ for suffix field 716 may be obtained as follows:

$$\hat{d}(n) = \hat{b}(n) \text{ for } 0 \le n \le 447, \text{ and}$$

$$\hat{g}(n) = \hat{b}(n+448) \text{ for } 0 \le n \le 63. \qquad \text{Eq (12)}$$

The equalized samples have residual ISI, which may be compensated with post time-domain equalization. In the absence of noise and with perfect equalization, the transmitted and received suffix should be identical. The transmitted suffix may be used as a reference signal for the time-domain equalization. The residual ISI spans a smaller time duration than the channel delay spread. This fact may be exploited to reduce the complexity of a time-domain equalizer.

The receiver may determine channel gain errors, as follows:

$$E(k) = \frac{1}{\sqrt{P}} \cdot \frac{Y_p(k)}{\hat{C}(k) \cdot P(k)}, \text{ for } k = 0, \ldots, P-1, \qquad \text{Eq (13)}$$

where E(k) is the channel gain error for tone k.

In general, E(k) may be derived based on either the pilot or the suffix or both. The pilot is used for driving the coefficients of the frequency-domain equalizer and hence may not provide independent new information. From this perspective, using the suffix may be better. However, since E(k) is used only in determining the placement of the taps of the time-domain equalizer, and not in deriving the taps of this equalizer, either the pilot or the suffix or both may be used to derive E(k). E(k) may be computed separately for each of the pilots and suffixes. Then, for each data block, an average E(k) may be computed based on few nearest pilots and/or suffixes and used to determine the equalizer tap locations for that data block.

The receiver may transform the channel gain errors for all P tones, as follows:

$$e(n) = \frac{1}{\sqrt{P}} \cdot \sum_{k=-P/2}^{P/2-1} E(k) \cdot e^{j 2\pi \cdot k \cdot n/P}, \text{ for } n = 0, \ldots, P-1, \quad \text{Eq (14)}$$

where e(n) is a time-domain representation of E(k). Each of the P taps from equation (14) may be compared against a threshold, and the indices of the taps that exceed the threshold may be deemed as significant tap locations. A single strongest tap may be identified, and a single significant tap location for this strongest tap may be used. The significant tap location(s) may be denoted as $\{\tau_\ell\}$.

The coefficient(s) of the time-domain equalizer may be derived by solving the following optimization:

$$\phi(a) = \sum_{n=0}^{P-1} \left| \hat{g}(n) - g(n) - \sum_\ell a(\ell) \cdot \hat{g}(n - \tau_\ell) \right|^2, \quad \text{Eq (15)}$$

where a($\ell$) is a hypothesized time-domain equalizer, and $\phi$(a) is an accumulated mean square error for a($\ell$).

In equation (15), the residual ISI is estimated as $$\sum_\ell a(\ell) \cdot \hat{g}(n - \tau_\ell)$$

The residual ISI and the transmitted suffix g(n) are subtracted from the equalized suffix ĝ(n), and the resultant errors are squared and accumulated to obtain $\phi$(a).

Different sets of coefficient(s) a($\ell$) may be evaluated, and the set that provides the minimum $\phi$(a) may be selected, as follows:

$$a_{opt} = \arg\min_a \phi(a). \quad \text{Eq (16)}$$

An MMSE or ZF-MMSE solution may be derived for the optimization shown in equations (15) and (16). The solution provides a set of coefficients $a_{opt}(\ell)$ for the time-domain equalizer. The receiver may then perform time-domain equalization as follows:

$$\tilde{d}(n) = \hat{d}(n) - \sum_\ell a_{opt}(\ell) \cdot \hat{d}(n - \tau_\ell), \quad \text{Eq (17)}$$

where $$\sum_\ell a_{opt}(\ell) \cdot \hat{d}(n - \tau_\ell)$$

represents the estimated residual ISI for the data block, and d̃(n) represents the improved equalized data with the residual ISI removed.

As described above, the suffix may be used to derive the coefficient(s) for the time-domain equalizer, which may then be used to remove the residual ISI in the data block.

Figure 8:
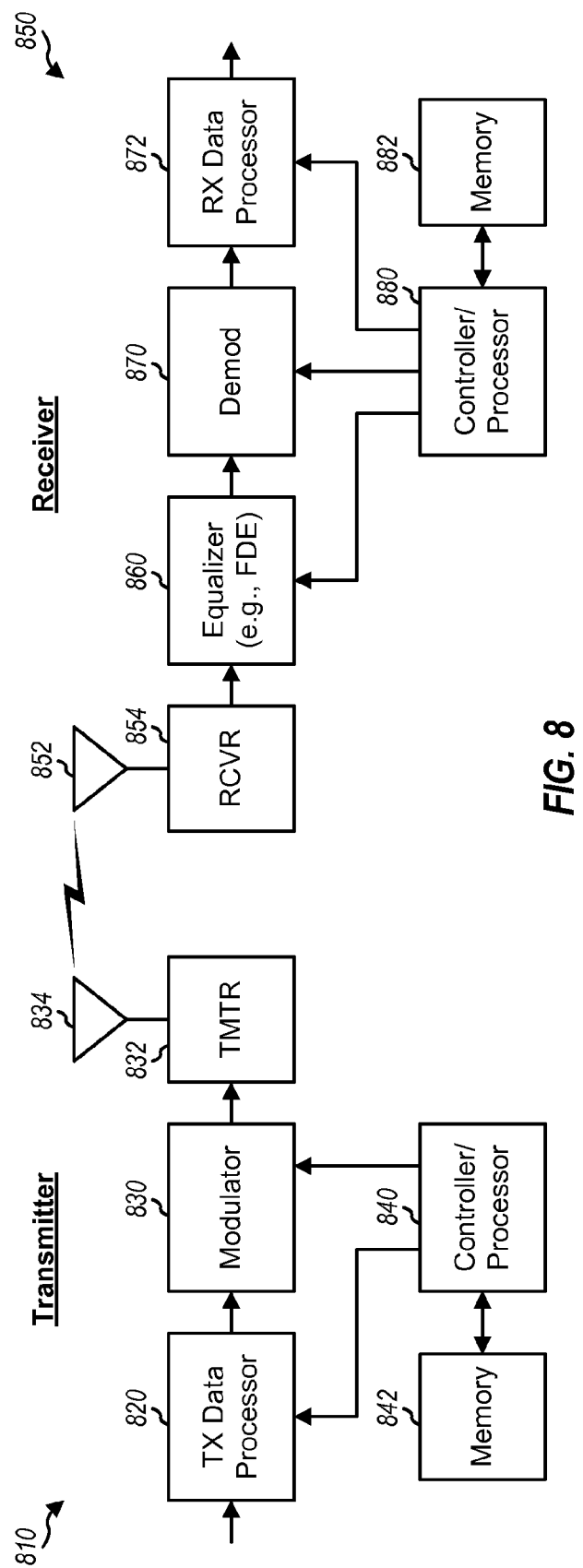
FIG. 8 shows a block diagram of a transmitter and a receiver.

FIG. 8 shows a block diagram of an embodiment of a transmitter 810 and a receiver 850. Transmitter 810 may be part of a Node B, and receiver 850 may be part of a UE. At transmitter 810, a transmit (TX) data processor 820 processes (e.g., encodes, interleaves, and symbol maps) traffic data and generates data symbols. Processor 820 also generates signaling symbols and pilot symbols. A modulator 830 processes the data, signaling and pilot symbols in a manner specified by the system and provides output chips. A transmitter unit (TMTR) 832 processes (e.g., converts to analog, amplifies, filters, and frequency upconverts) the output chips and generates an RF signal, which is transmitted from an antenna 834.

At receiver 850, an antenna 852 receives the transmitted RF signal and provides a received RF signal. A receiver unit (RCVR) 854 conditions (e.g., filters, amplifies, frequency downconverts, and digitizes) the received RF signal and provides received samples. An equalizer 860 performs equalization on the received samples and provides equalized samples. Equalizer 860 may implement a frequency-domain equalizer (FDE) and/or a time-domain equalizer. A demodulator (Demod) 870 processes the equalized samples in a manner complementary to the processing by modulator 830 and provides symbol estimates. A receive (RX) data processor 872 processes (e.g., symbol demaps, deinterleaves, and decodes) the symbol estimates and provides decoded data and signaling. In general, the processing by demodulator 870 and RX data processor 872 is complementary to the processing by modulator 830 and TX data processor 820, respectively, at transmitter 810.

Controllers/processors 840 and 880 direct the operation of various processing units at transmitter 810 and receiver 850, respectively. Memories 842 and 882 store data and program codes for transmitter 810 and receiver 850, respectively.

Figure 9A:
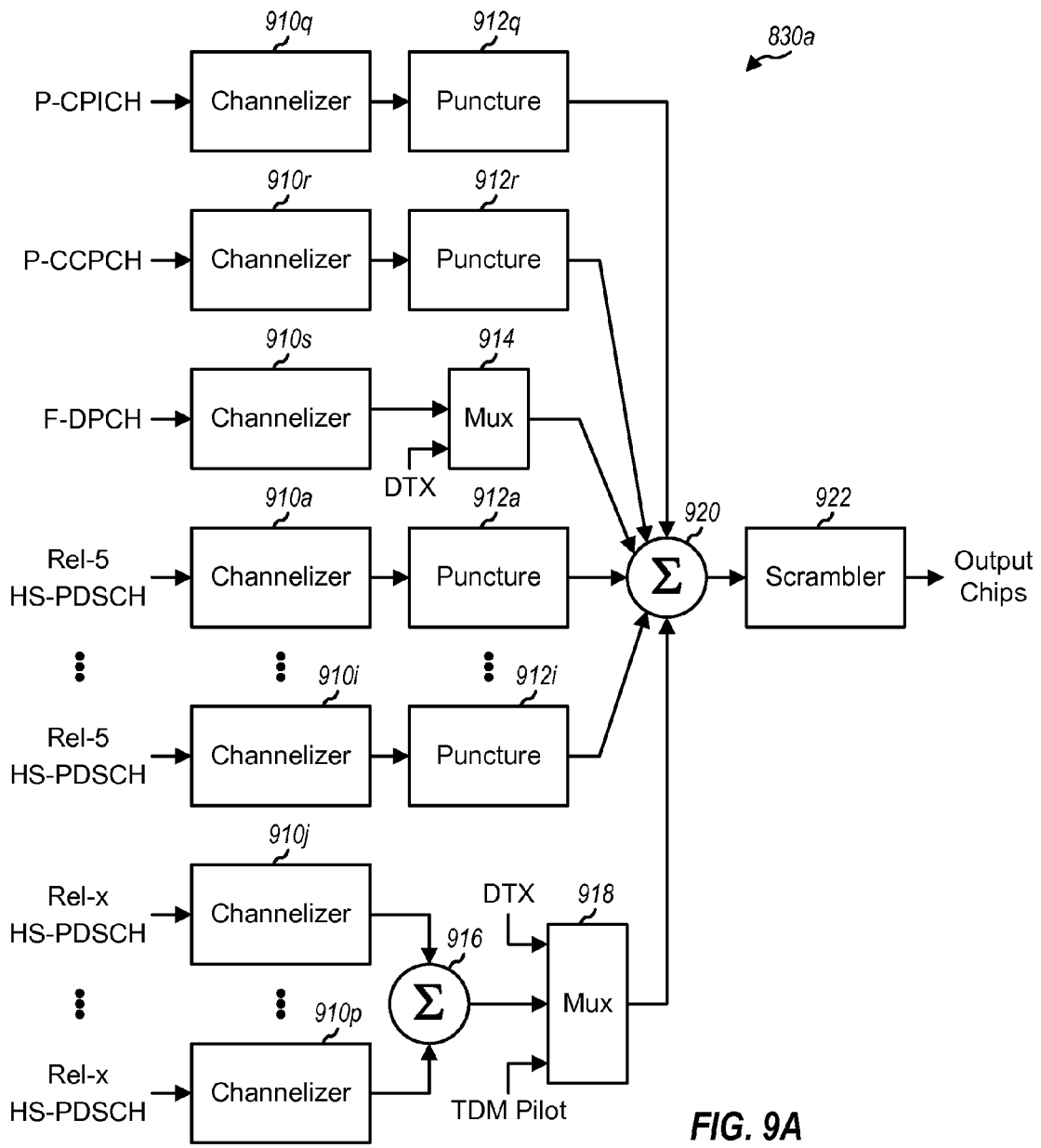
FIGS. 9A and 9B show block diagrams of two embodiments of a modulator.

FIG. 9A shows a block diagram of a modulator 830a, which is an embodiment of modulator 830 in FIG. 8. Modulator 830a may be used for the slot structures shown in FIGS. 5 through 6B. Modulator 830a supports up to 15 HS-PDSCHs, which may include any number of Rel-5 HS-PDSCHs and any number of Rel-x HS-PDSCHs.

Within modulator 830a, the symbols for each physical channel are provided to a respective channelizer 910, which channelizes the symbols with a channelization code for the physical channel. Puncture units 912a through 912i receive the outputs of channelizers 910a through 910i, respectively, for the Rel-5 HS-PDSCHs and may puncture the sections of the Rel-5 HS-PDSCHs that overlap the pilot and/or guard intervals in the Rel-x HS-PDSCHs. Similarly, puncture units 912q and 912r receive the outputs of channelizers 910q and 910r, respectively, and may puncture the sections of the P-CPICH and P-CCPCH that overlap the pilot and/or guard intervals in the Rel-x HS-PDSCHs. A multiplexer (Mux) 914 provides (1) the output of channelizer 910s in symbol periods used for transmission and (2) DTX in symbol periods not used for transmission, which may be those that overlap the pilot and/or guard intervals in the Rel-x HS-PDSCHs. Puncture units 912 and multiplexer 914 may also be omitted.

A summer 916 sums the outputs of channelizers 910j through 910p for the Rel-x HS-PDSCHs. In each slot, a multiplexer 918 provides the output of summer 916 for the data fields, provides DTX for the guard fields, and provides the TDM pilot for the pilot field. A summer 920 sums the outputs of puncture units 912 and multiplexers 914 and 918.

A scrambler 922 scrambles the output of summer 920 with a scrambling code assigned to the Node B and provides the output chips for the Node B.

Figure 9B:
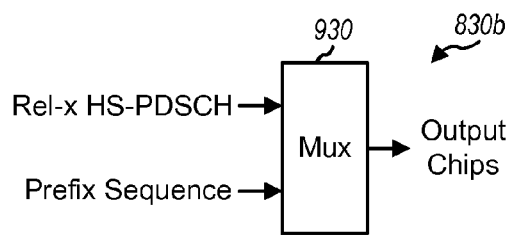

FIG. 9B shows a block diagram of a modulator 830b, which is another embodiment of modulator 830 in FIG. 8. Modulator 830b may be used for the slot structures shown in FIGS. 7A through 7C. Modulator 830b supports a single Rel-x HS-PDSCH. Within modulator 830b, a multiplexer 930 receives symbols for the Rel-x HS-PDSCH and a prefix sequence. In each slot, multiplexer 930 provides the symbols for the data fields and provides the prefix sequence for the pilot and guard fields.

FIGS. 9A and 9B show two embodiments of modulators that support the slot structures described herein. In general, a modulator may be designed to support any slot structure and any set of physical channels.

Figure 10A:
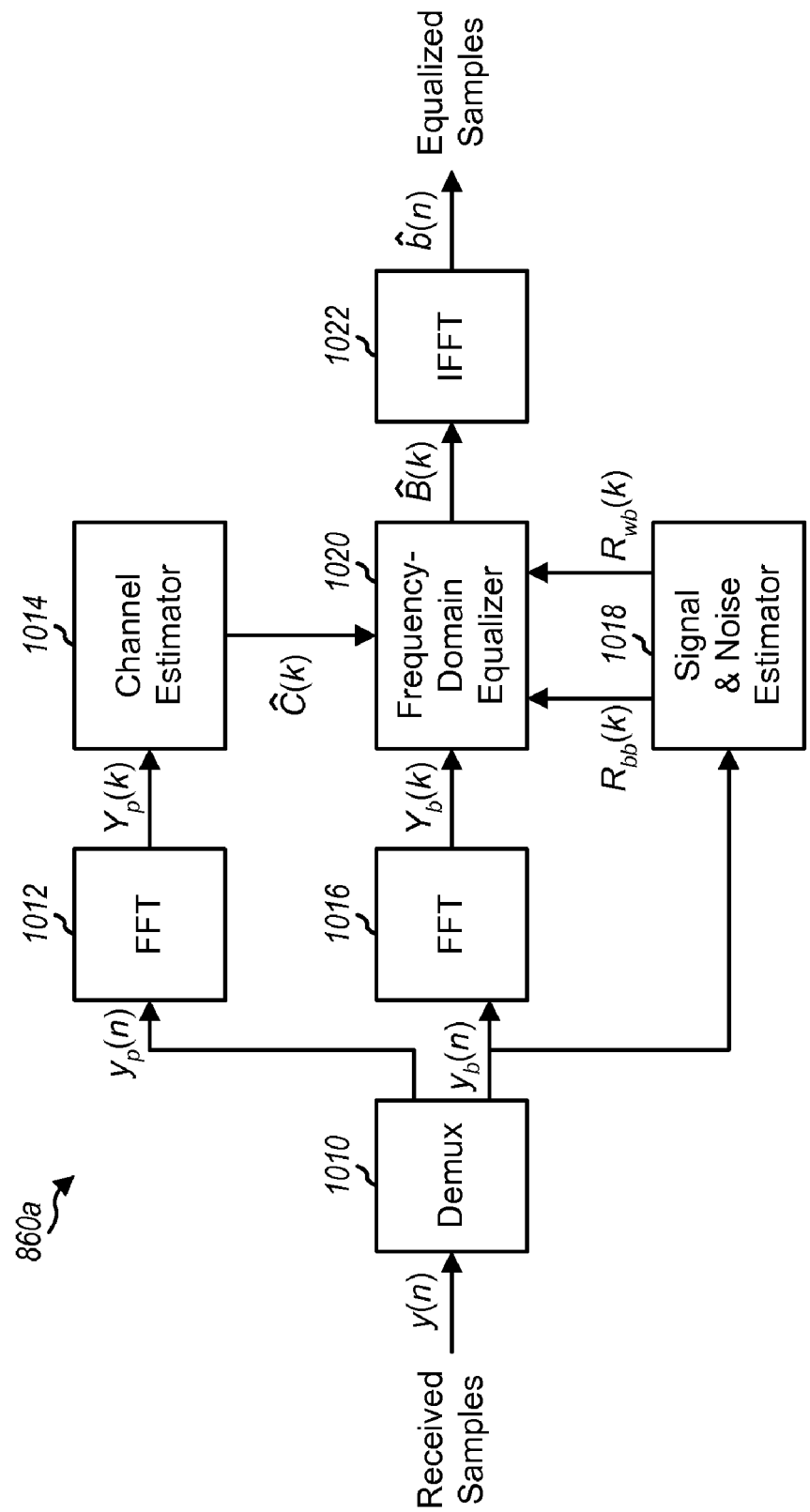
FIGS. 10A and 10B show block diagrams of two embodiments of an equalizer.

FIG. 10A shows a block diagram of an equalizer 860a, which is an embodiment of equalizer 860 in FIG. 8. Equalizer 860a may be used for the Rel-x HS-PDSCHs sent using any of the slot structures shown in FIGS. 5 through 7C.

Within equalizer 860a, a demultiplexer (Demux) 1010 obtains received samples from receiver unit 854, provides received samples $y_p(n)$ for the pilot to an FFT unit 1012, and provides received samples $y_b(n)$ for the data blocks and guard intervals/suffixes to an FFT unit 1016. FFT unit 1012 transforms the received samples for the pilot to the frequency domain and provides frequency-domain symbols $Y_p(k)$. A channel estimator 1014 derives channel gain estimates $\hat{C}(k)$ for the tones used for data transmission, e.g., as shown equation (5) or (6). Channel estimator 1014 may also perform post-processing, filtering, and so on.

FFT unit 1016 transforms the received samples for each data block and its suffix to the frequency domain and provides frequency-domain symbols $Y_b(k)$. A signal and noise estimator 1018 may derive estimates of $R_{bb}(k)$ and $R_{wb}(k)$ based on the received samples. A frequency-domain equalizer 1020 performs equalization on symbols $Y_b(k)$ in the frequency domain with the channel gain estimates and possibly the estimates of $R_{bb}(k)$ and $R_{wb}(k)$, e.g., as shown in equation (10) or (11), and provides equalized symbols $\hat{B}(k)$. An IFFT unit 1022 transforms the equalized symbols $\hat{B}(k)$ to the time domain and provides equalized samples $\hat{b}(n)$.

Figure 10B:
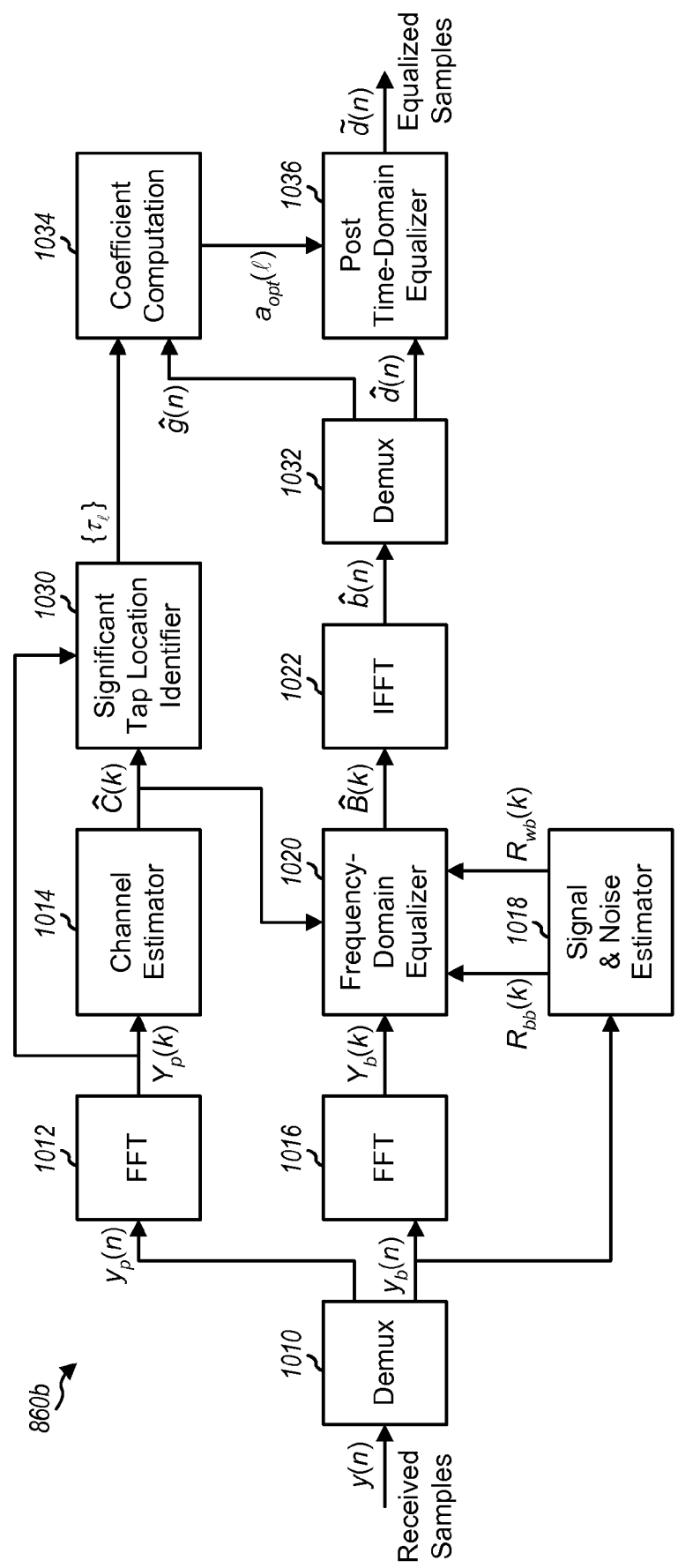

FIG. 10B shows a block diagram of an equalizer 860b, which is another embodiment of equalizer 860 in FIG. 8. Equalizer 860b may be used for the Rel-x HS-PDSCHs sent using any of the slot structures shown in FIGS. 7A through 7C. Equalizer 860b includes demultiplexer 1010, FFT units 1012 and 1016, channel estimator 1014, signal and noise estimator 1018, frequency-domain equalizer 1020, and IFFT unit 1022 that operate as described above for FIG. 10A.

Equalizer 860b further includes units that perform post time-domain equalization to remove residual ISI. Within equalizer 860b, a unit 1030 receives the channel gain estimates $\hat{C}(k)$ and the received symbols $Y_p(k)$ for the pilot and determines the significant tap locations $\{\tau_\ell\}$. A demultiplexer 1032 receives the equalized samples $\hat{b}(n)$ from IFFT unit 1022, provides the equalized samples $\hat{g}(n)$ for the suffix to a coefficient computation unit 1034, and provides the equalized samples $\hat{d}(n)$ for a data block to a time-domain equalizer 1036. Unit 1034 derives the coefficient(s) for time-domain equalizer 1036, e.g., as described above for equations (15) and (16). Time-domain equalizer 1036 performs equalization on the samples $\hat{d}(n)$ with the coefficient(s) from unit 1034 and provides improved equalized samples $\tilde{d}(n)$ having residual ISI removed.

FIGS. 10A and 10B show two embodiments of equalizers that may be used with the slot structures described herein. In general, an equalizer may be designed to support any slot structure.

FIG. 11 shows an embodiment of a process 1100 for transmitting data and pilot using the slot structures described herein. Process 1100 may be performed by a Node B or some other transmitter.

Guard intervals are appended to data blocks such that each data block has a guard interval at the beginning of the data block and a guard interval at the end of the data block (block 1112). The guard interval at the beginning of each data block is equal to the guard interval at the end of the data block. Each guard interval may comprise DTX, a polyphase sequence, or some other transmission. Pilot is appended to each set of at least one data block (block 1114). The pilot may be a TDM pilot, e.g., as shown in FIGS. 5 through 6B. The pilot may also be a guard interval, e.g., one of two guard intervals that are adjacent to one another, as shown in FIGS. 7A through 7C. The pilot may also be sent in other manners. The data blocks, pilot, and guard intervals may be mapped to a slot, e.g., using any one of the slot structures shown in FIGS. 5 through 7C.

The data blocks, pilot, and guard intervals are processed for transmission (block 1116). This processing may include mapping the data blocks to at least one physical channel, e.g., Rel-x HS-PDSCH. The processing may also include channelizing the data blocks for each physical channel with a channelization code for that physical channel, combining the channelized data for all physical channels, and scrambling the combined data, pilot, and guard intervals with a scrambling code, e.g., as shown in FIG. 10A. Other physical channels (e.g., P-CPICH, P-CCPCH, F-DPCH and/or Rel-5 HS-PDSCH) may also be sent and may be channelized, combined, and scrambled, as also shown in FIG. 10A. The data for the other physical channels may be punctured in the sections that overlap the guard intervals and/or pilot of the Rel-x HS-PDSCHs.

FIG. 12 shows an embodiment of a process 1200 for receiving data and pilot sent using the slot structures described herein. Process 1200 may be performed by a UE or some other receiver.

Received samples are demultiplexed to obtain a first block of received samples for a known transmission and a second block of received samples for a transmitted data block (block 1212). Data blocks are transmitted such that each data block has a guard interval at the beginning of the data block and a guard interval at the end of the data block. Each guard interval may be DTX, a polyphase sequence, or some other sequence. The known transmission may be a TDM pilot and may comprise the polyphase sequence. The guard intervals and pilot may also be sent in other manners.

A channel estimate is derived based on the first block of received samples (block 1214). Equalization is performed on the second block of received samples with the channel estimate (block 1216). For block 1214, an FFT may be performed on the first block of received sample, and the resultant symbols may be used to derive frequency-domain channel gain estimates. For block 1216, an FFT may be performed on the second block of received samples to obtain frequency-domain symbols. Equalization may then be performed on the frequency-domain symbols with the channel gain estimates to obtain equalized symbols. An IFFT may be performed on the equalized symbols to obtain time-domain equalized samples. Post equalization may be performed on the equalized samples in the time domain. Coefficient(s) may be derived based on the equalized samples for the known sequence. Post equalization may then be performed on the equalized samples for the data block with the coefficient(s). If applicable, the equalized samples may be descrambled with a descrambling code, and the descrambled samples may be dechannelized/despread with a channelization code for a physical channel used to send the data block.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus comprising:
   at least one processor configured to demultiplex received samples to obtain a first block of received samples for a known transmission and a second block of received samples for a transmitted data block, wherein the transmitted data block has a guard interval at the beginning of the data block and a guard interval at the end of the data block, to derive a channel estimate based on the first block of received samples, and to perform equalization on the second block of received samples with the channel estimate; and
   a memory coupled to the at least one processor;
   wherein each guard interval is discontinuous transmission (DTX), and wherein the known transmission is a time division multiplexed (TDM) pilot.

2. The apparatus of claim 1, wherein each guard interval comprises a polyphase sequence, and wherein the known transmission comprises the polyphase sequence.

3. An apparatus comprising:
   at least one processor configured to demultiplex received samples to obtain a first block of received samples for a known transmission and a second block of received samples for a transmitted data block, wherein the transmitted data block has a guard interval at the beginning of the data block and a guard interval at the end of the data block, to derive a channel estimate based on the first block of received samples, and to perform equalization on the second block of received samples with the channel estimate; and
   a memory coupled to the at least one processor;
   wherein each of the first and second blocks has a duration that is a power of two, and wherein the at least one processor is configured to perform a first fast Fourier transform (FFT) on the first block of received samples, to perform a second FFT on the second block of received samples, and to perform equalization in frequency domain.

4. The apparatus of claim 3, wherein the at least one processor is configured to derive frequency-domain channel gain estimates based on outputs of the first FFT, and to perform equalization on outputs of the second FFT in frequency domain with the channel gain estimates.

5. An apparatus comprising:
   at least one processor configured to demultiplex received samples to obtain a first block of received samples for a known transmission and a second block of received samples for a transmitted data block, wherein the transmitted data block has a guard interval at the beginning of the data block and a guard interval at the end of the data block, to derive a channel estimate based on the first block of received samples, and to perform equalization on the second block of received samples with the channel estimate; and
   a memory coupled to the at least one processor;
   wherein the at least one processor is configured to derive frequency-domain channel gain estimates based on the first block of received samples, to transform the second block of received samples to obtain frequency-domain symbols, to perform equalization on the frequency-domain symbols with the channel gain estimates to obtain equalized symbols, to transform the equalized symbols to obtain time-domain equalized samples, and to perform post equalization on the equalized samples.

6. The apparatus of claim 5, wherein the second block of received samples comprises the transmitted data block and the known sequence, and wherein the at least one processor is configured to derive at least one coefficient based on equalized samples for the known sequence, and to perform post equalization on equalized samples for the transmitted data block with the at least one coefficient.

7. An apparatus comprising:
at least one processor configured to demultiplex received samples to obtain a first block of received samples for a known transmission and a second block of received samples for a transmitted data block, wherein the transmitted data block has a guard interval at the beginning of the data block and a guard interval at the end of the data block, to derive a channel estimate based on the first block of received samples, and to perform equalization on the second block of received samples with the channel estimate; and
a memory coupled to the at least one processor;
wherein the at least one processor is configured to descramble equalized samples with a descrambling code.

8. The apparatus of claim 7, wherein the at least one processor is configured to dechannelize descrambled samples with at least one channelization code for at least one physical channel.

9. A method comprising:
demultiplexing received samples of a transmitted signal to obtain a first block of received samples for a known transmission and a second block of received samples for a transmitted data block, wherein the transmitted data block has a guard interval at the beginning of the data block and a guard interval at the end of the data block;
deriving a channel estimate based on the first block of received samples; and
performing equalization on the second block of received samples with the channel estimate to obtain equalized samples;
wherein each guard interval is discontinuous transmission (DTX), and wherein the known transmission is a time division multiplexed (TDM) pilot.

10. The method of claim 9, wherein each guard interval comprises a polyphase sequence, and wherein the known transmission comprises the polyphase sequence.

11. A method comprising:
demultiplexing received samples of a transmitted signal to obtain a first block of received samples for a known transmission and a second block of received samples for a transmitted data block, wherein the transmitted data block has a guard interval at the beginning of the data block and a guard interval at the end of the data block;
deriving a channel estimate based on the first block of received samples; and
performing equalization on the second block of received samples with the channel estimate;
wherein the channel estimate comprises frequency-domain channel gain estimates, and wherein the performing equalization on the second block of received samples comprises:
transforming the second block of received samples to obtain frequency-domain symbols,
performing equalization on the frequency-domain symbols with the channel gain estimates to obtain equalized symbols, and
transforming the equalized symbols to obtain time-domain equalized samples.

12. A method comprising:
demultiplexing received samples of a transmitted signal to obtain a first block of received samples for a known transmission and a second block of received samples for a transmitted data block, wherein the transmitted data block has a guard interval at the beginning of the data block and a guard interval at the end of the data block;
deriving a channel estimate based on the first block of received samples; and
performing equalization on the second block of received samples with the channel estimate to obtain equalized samples;
wherein the second block of received samples comprises the transmitted data block and the known sequence, and wherein the performing equalization on the second block of received samples further comprises:
deriving at least one coefficient based on equalized samples for the known sequence, and
performing post equalization on equalized samples for the transmitted data block with the at least one coefficient.

13. An apparatus comprising:
means for demultiplexing received samples to obtain a first block of received samples for a known transmission and a second block of received samples for a transmitted data block, wherein data blocks are transmitted such that each data block has a guard interval at the beginning of the data block and a guard interval at the end of the data block;
means for deriving a channel estimate based on the first block of received samples; and
means for performing equalization on the second block of received samples with the channel estimate;
wherein each guard interval is discontinuous transmission (DTX), and wherein the known transmission is a time division multiplexed (TDM) pilot.

14. The apparatus of claim 13, wherein each guard interval comprises a polyphase sequence, and wherein the known transmission comprises the polyphase sequence.

15. An apparatus comprising:
means for demultiplexing received samples to obtain a first block of received samples for a known transmission and a second block of received samples for a transmitted data block, wherein data blocks are transmitted such that each data block has a guard interval at the beginning of the data block and a guard interval at the end of the data block;
means for deriving a channel estimate based on the first block of received samples; and
means for performing equalization on the second block of received samples with the channel estimate;
wherein the channel estimate comprises frequency-domain channel gain estimates, and wherein the means for performing equalization on the second block of received samples comprises:
means for transforming the second block of received samples to obtain frequency-domain symbols,
means for performing equalization on the frequency-domain symbols with the channel gain estimates to obtain equalized symbols, and
means for transforming the equalized symbols to obtain time-domain equalized samples.

16. The apparatus of claim 15, wherein the second block of received samples comprises the transmitted data block and the known sequence, and wherein the means for performing equalization on the second block of received samples further comprises:

means for deriving at least one coefficient based on equalized samples for the known sequence, and means for performing post equalization on equalized samples for the transmitted data block with the at least one coefficient.

* * * * *